W. N. WEST.
Corn-Harvester.

No. 159,990.

Patented Feb. 16, 1875.

UNITED STATES PATENT OFFICE.

WILLIAM N. WEST, OF MILFORD, MICHIGAN.

IMPROVEMENT IN CORN-HARVESTERS.

Specification forming part of Letters Patent No. 159,990, dated February 16, 1875; application filed December 11, 1874.

*To all whom it may concern:*

Be it known that I, WILLIAM N. WEST, of Milford, in the county of Oakland and State of Michigan, have invented an Improvement in Harvester, of which the following is a specification:

The nature of this invention relates to certain new and useful improvements in attachments to harvesters, by means of which corn may be cut up, bound in shocks, and delivered from the machine onto the ground with great facility.

Figure 1:
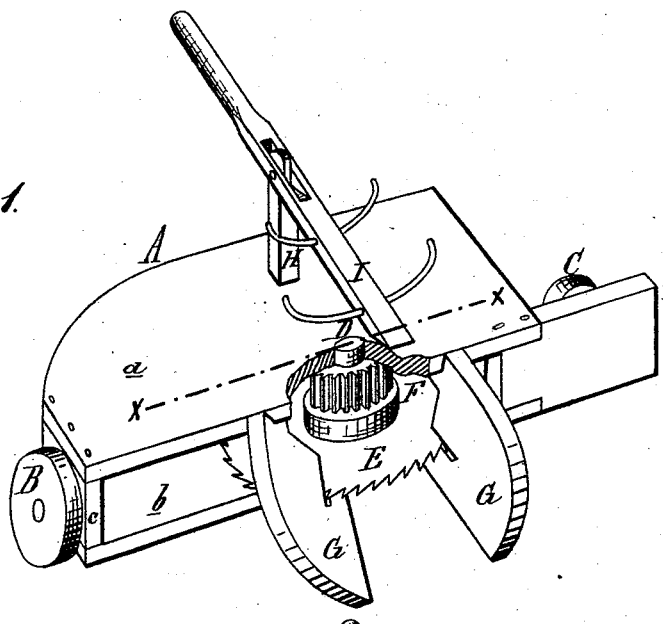
Figure 2:
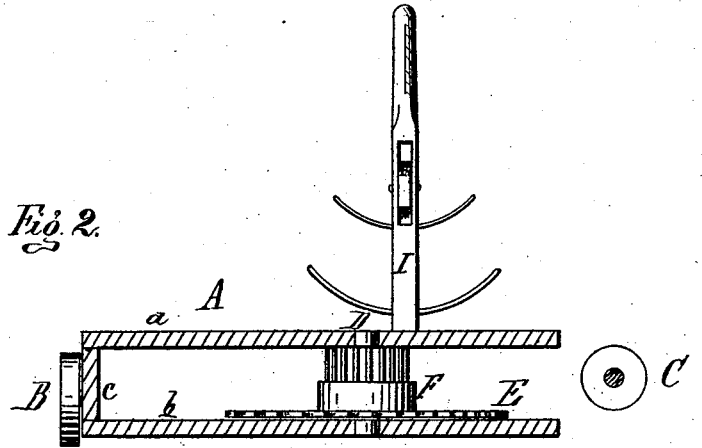

Figure 1 is a perspective view of my attachment, with a portion of the top broken out to show the arrangement of arbor, saw, and pulley. Fig. 2 is a longitudinal vertical section on the line $x\ x$ in Fig. 1.

Like letters indicate like parts in each figure.

In the accompanying drawings, A represents a frame of suitable construction, consisting of the upper and lower boards $a\ b$, secured together at their outer ends by the timber $c$, to which is secured the bearing-wheel B, designed to carry the outer end of the attachment. The opposite end of the frame is designed to be attached, by any proper devices, to the frame of a harvester, a portion of which, with the pitman or crank-wheel C attached, is shown in the drawings. D is a saw-arbor, suitably journaled vertically to and between the upper and lower boards of the frame. Upon this arbor is secured the circular saw E and pulley F, and motion is communicated thereto by a suitable belt from the crank or pitman wheel C. Instead of pulleys and belts a geared connection may be made, if desired. Guides G, standing at an inclination to each other, and with the opening wider between their free ends than at the other ends, are secured in the position shown in the drawings, so that in the advance of the machine these guides will straighten up the straggling stalks or spears, and confine them to the action of the saw. H is a vertical post, so secured to the top board $a$ as to have a revolving or rotary motion, when desired. To the top of this post is pivoted a bar, I, provided with curved fingers, designed to catch the stalks as they are cut by the saw. When a sufficient quantity has thus been caught, by depressing the outer end of the bar the shock may be, by the rotation of the post, deposited at the rear or either side of the machine.

When it is desired to use this attachment, the sickle-bar and platform are removed from the harvester, and the attachment secured in their place.

What I claim as my invention, and desire to secure by Letters Patent, is—

1. The combination of the revolving post H and bar I, provided with curved fingers, with the frame A, when the parts are arranged to operate substantially as and for the purposes described.

2. The combination, with the frame A, of the arbor D, saw E, guides G, revolving post H, bar I, provided with curved fingers, and wheel B, all constructed and arranged substantially as described and shown, for the purpose set forth.

WM. N. WEST.

Witnesses:
H. F. EBERTS,
H. S. SPRAGUE.